United States Patent [19]

Tozoni

[11] Patent Number: 5,717,261
[45] Date of Patent: Feb. 10, 1998

[54] LINEAR SYNCHRONOUS MOTOR WITH SCREENING PERMANENT MAGNET ROTOR WITH EXTENDIBLE POLES

[76] Inventor: Oleg V. Tozoni, 11911 Parklawn Dr. #304, Rockville, Md. 20852

[21] Appl. No.: 631,002

[22] Filed: Apr. 12, 1996

[51] Int. Cl.⁶ .................................................. H02K 41/03
[52] U.S. Cl. ............................ 310/12; 318/135; 104/282
[58] Field of Search ........................... 310/12, 13, 14, 310/46, 156; 318/135; 104/282, 283, 286

[56] References Cited

U.S. PATENT DOCUMENTS

| | | |
|---|---|---|
| 5,208,496 | 5/1993 | Tozoni et al. ........................ 310/12 |
| 5,225,726 | 7/1993 | Tozoni ............................. 310/156 X |

Primary Examiner—Steven L. Stephan
Assistant Examiner—Judson H. Jones

[57] ABSTRACT

A Linear Synchronous Motor for a high-speed, ground transportation vehicle includes a linear extended guideway stator assembly containing two extended symmetrical three-phase stator windings supported on the guideway and a rotor installed on the vehicle chassis and having an even number of identical units. When the winding is powered by three-phase sinusoidal current of constant frequency, the traveling wave of the sinusoidal current arises and runs along the stator. By varying the length of the turns of the stator windings, the velocity of the traveling wave is variable on different sections of the guideway, which include acceleration section, constant velocity section and deceleration section. Each of the rotor units includes vertically magnetized permanent magnets and two "C"-shaped steel cores which close the magnetic lines through two parallel air gaps. The permanent magnets move downward and upward within the "C"-shaped steel cores. The turns of the stator windings pass through the air gaps in the rotor units, so that the traveling wave interacts with the magnetic field in the air gaps and creates the Lorenz force propelling the vehicle. Two synchronizing devices are operatively associated with the rotor to coordinate the length of the turns of the stator windings with the length of the pole-pitch of the rotor. One of the synchronizing devices controls movement of the permanent magnets upward and downward with respect to the "C"-shaped steel cores to change the pole-pitch of the rotor step-wise, and another one moves the units of the rotor apart and together to change the pole-pitch of the rotor smoothly. As the result, the linear synchronous motor provides the vehicle motion with designated speed at any section of the guideway/stator.

13 Claims, 7 Drawing Sheets

LINEAR SYNCHRONOUS MOTOR WITH SCREENING PERMANENT MAGNET ROTOR WITH EXTENDIBLE POLES

BACKGROUND OF THE INVENTION

The present invention relates basically to linear synchronous motors, and more particularly to a linear synchronous motors, having screening permanent magnet rotors with extendible poles for a High Speed Ground Transportation System, in which the stator determines the guideway for a transportation vehicle.

A linear synchronous motor having variable pole pitches is described in U.S. Pat. Nos. 5,208,496 and 5,225,726, the disclosure of which is incorporated herein by reference.

The known constructions of the linear synchronous motors based on superconductive magnets require multiphased power supply with variable frequency control. As a result, each individual moving vehicle must be powered by its own generator of alternative frequency, thus significantly complicating maintenance of the Maglev transportation system and considerably increasing expenses.

Economic and other factors require that the guideways of the Maglev transportation system approximately follow the path of automobile highways. The speed limit of the vehicles on the highways is approximately 55–65 m/h. In contrast, reasonably anticipated velocities for Maglev vehicles are 300–400 m/h, about 5–6 times higher than automobile velocities. Accordingly, if a guideway extends parallel to a highway a vehicle traveling on a curved portion of the guideway will experience a centrifugal force per unit of vehicle mass 25–35 times greater than the centrifugal force an automobile on the highway will experience. This result occurs because the centrifugal force $F_c$ is proportional to the square of the velocity:

$$F_c = m_v V^2 / R,$$

where $m_v$ is vehicle mass and R is the guideway radius of the curvature.

As a result of this increased force it is necessary to provide a means for decelerating the vehicle when it traverses a curved portion of the guideway. Moreover, a means should also be provided to ensure the stability of the vehicle on the guideway. Both of these means should be provided in a reliable and inexpensive manner.

In known Maglev systems, deceleration along curves is provided by a rapid-response automatic system controlling vehicle movement by affecting the variable frequency generator which supplies power to the vehicle when it is between stations. Such systems are complex, expensive and unreliable.

The ability of self-regulation and high rigidness of the stabilizing forces in Magnetodynamic levitation and stabilizing selfregulating system (patent application Ser. No. 08/575,065 filed Dec. 19, 1995) provide for safe vehicular flight at small gaps between the levitator magnets and stator cores. This peculiarity allows application of a new kind of construction of linear synchronous motors for vehicle propulsion with small working air gap using permanent magnets (PMLSM—Permanent Magnet Linear Synchronous Motor). The velocity of current traveling wave in the propulsion winding of the stator is proportional to its turn length. Thus, to vary velocity it is sufficient to vary the turn length at different sections of the stator, providing alternating velocity at these sections. A peculiarity of the PMLSM construction is that during vehicle movement it makes it possible to change the length of the pole pitch of the rotor in accordance with changing stator winding turn length and, thus, to use the traveling current wave to create the propulsion force.

SUMMARY OF THE INVENTION

The proposed permanent magnet linear synchronous motor comprises a linear guideway/stator assembly (stationary part) and permanent magnet rotor assembly with synchronizing devices (moving part).

The rotor of the PMLSM consists of an even number of identical units (FIG. 1) installed on the vehicle chassis in a row along the vehicle. Each unit contains two steel cores and one permanent magnet. Said steel cores are cylindrical in form and have "C"-shaped cross-sections with upper and lower core shoes placed opposite to each other. The permanent magnet is designed in the form of a rectangular parallelepiped with steel pole saddle-shaped shoes rigidly attached to it. Said permanent magnet is inserted into the gap between the core shoes and can be shifted vertically with respect to the cores. The magnetization vector of all magnets is vertical in direction. Polarities of the magnets belonging to the front half of the rotor are the same and opposite to those belonging to the back one. The cores belonging to each half of the rotor are rigidly coupled, however both halves can be smoothly drawn apart or together along the car, thus changing the distance between the rotor poles as the vehicle moves.

The guideway/stator of PMLSM consists of two mirror symmetrical parallel parts of the propulsion winding distributed along the whole stator length and powered by triple-phase sinusoidal current of constant frequency. Every part includes a common concrete beam and the toothed holder attached to said beam, which bears the conductors of the triple-phase winding. Every winding has vertical working segments containing one layer of copper buses and two multi-layer end-faces. The bottom end-face is rigidly attached to the concrete foundation of the guideway, while the upper one is not fixed and inserts into the hollow of the rotor core.

The stator winding is distributed non-uniformly along the guideway, which consists of three types of sections:

1. an acceleration section in which the winding turn length gradually increases along the vehicle movement;

2. a constant speed section with invariable winding turn length;

3. a deceleration section in which the winding turn length gradually decreases along the vehicle movement.

Accordingly, the length and velocity of the current traveling wave is also different along different sections of the guideway.

When the permanent magnet is shifted downward the unit is put into operation; at that point, together with its cores, the magnet creates a two-loop magnetic circuit containing two air gaps. In this case, the working segments of both the left and the right-hand winding occur in the air gaps of said circuit and, because of the small size of the air gaps, the magnetic flux density is of considerable value (about 1 T). The traveling current waves created in the working segments of the winding sections interact with permanent magnetic field in the air gaps, thus engendering the propulsion force $F_x$ which propels the vehicle. When the permanent magnet is shifted upward the unit is disengages and at that point the magnetic flux density in the working segments of the winding falls nearly to zero. Once this has happened, the fluxes coming from each side of the magnet close through the upper end-faces of the windings. The propulsion force of an inactive unit is zero since all currents in the end-faces flow horizontally.

Both the synchronizing device and synchronizing mechanism are attached to the rotor and perform a coordination function between the length of the stator's winding turns and the rotor's pole pitch length during vehicle motion. Signal sensors must be installed at some points of the guideway along the acceleration or deceleration sections. When the vehicle passes the next sensor the synchronizing device of the rotor receives its signal and engages or disengages the next rotor units, thus increasing or decreasing in steps the rotor's pole pitch length. At that point, the synchronizing mechanism gradually draws the front and back rotor poles together or apart, thus assuring more precisely congruence between the rotor's pole pitch length and the stator's winding turns length.

Since there are no sensors along the constant speed sections, neither the synchronizing device nor synchronizing mechanism functions at that point and the vehicle moves with the invariable speed (acquired at the end of the acceleration section) $V_v = 2 fL_R n$, where $2n$ is the number of units put into operation.

We can now explain how the PMLSM works. We assume that the rotor comprises twelve units. At the initial point of the acceleration section the winding turn length is small but not less than the unit length $L_R$ and then gradually increases along this section. Approaching this section, the vehicle should increase speed $V_v = 2 fL_R$, and its two central units of opposite polarities (unit No. 6 and No. 7) should be engaged. This means that the rotor pole pitch equals the winding's turn length. Only under this condition can the rotor be synchronized with the traveling current wave and initiate acceleration of the vehicle. Then, as the stator winding turn length increases, additional units are engaged, thus increasing the size of the pole pitch. For example, at turn length 2 $L_R$ additional units No. 5 and No. 8 are engaged, etc.—until the winding turn length achieves value 1.5 m., corresponding to vehicle speed $V_v = 180$ m/s.

Approaching curved-guideway sections, the length of the turns of the guideway winding decreases until it reaches the desired value, and then increases again. Accordingly, said synchronizing device and synchronizing mechanism work in agreement: the synchronizing device disengages the corresponding units and then (after the vehicle has passed the curved part of the guideway) engage them again, while another mechanism draws together and apart the front and back halves of the rotor units. As a result, the speed of the vehicle and, correspondingly, centrifugal force decreases until the vehicle accomplishes the turning.

As each additional pair of the units is engaged, the propulsion force increases approximately by 1.7 ton reaching the maximum value >10 ton, when all units are operating. During deceleration all actions proceed in reverse order. The example of the approximate calculation of the PMLSM is shown below (in section "Detailed description").

Therefore, when supplying the propulsion winding with sinusoidal current of constant frequency f=60 Hz the vehicle will move along the trajectory assigned by the stator with preset optimal speed V(s) (where s is a trajectory coordinate), decelerating or accelerating its speed before or after turning respectively without exceeding the permissible centrifugal force. To attain this effect the guideway winding turn length must correspond to the radius of the curvature of the assigned trajectory.

The initial acceleration of the vehicle departing the station could be provided with the help of direct current motors installed on the supporting wheels of the vehicle and supplied with power from direct current contact busbars. This peculiarity makes the power supply of the propulsion winding of the proposed transportation system significantly simpler and cheaper. The propulsion winding can be switched in any network with frequency f=60 Hz. For example, if a high voltage line is built stretching along the guideway and step-down transformer substations are installed at short intervals, then the moving vehicle can switch on and off the power of the corresponding part of propulsion winding, thus eliminating the need for complex control and regulation of the frequency and voltage of propulsion currents.

DETAILED DESCRIPTION

For purposes of illustration the linear synchronous motor of the present invention will be described as applied to train motion. However this motor may be used in connection with any other type of vehicle. Furthermore, the motor may be used for any other purpose in addition to land-based vehicles. For example, the motor may be used to launch air-borne and space borne vehicles.

The Linear Synchronous Motor of the present invention is used together with MDLSS (Magnetodynamic levitation and stabilizing self-regulating system) disclosed in U.S. patent application Ser. No. 08/575,065 filed Dec. 19, 1995, shown in FIG. 1 and located on the vehicle chassis on both its right and left hand side.

Figure 1:
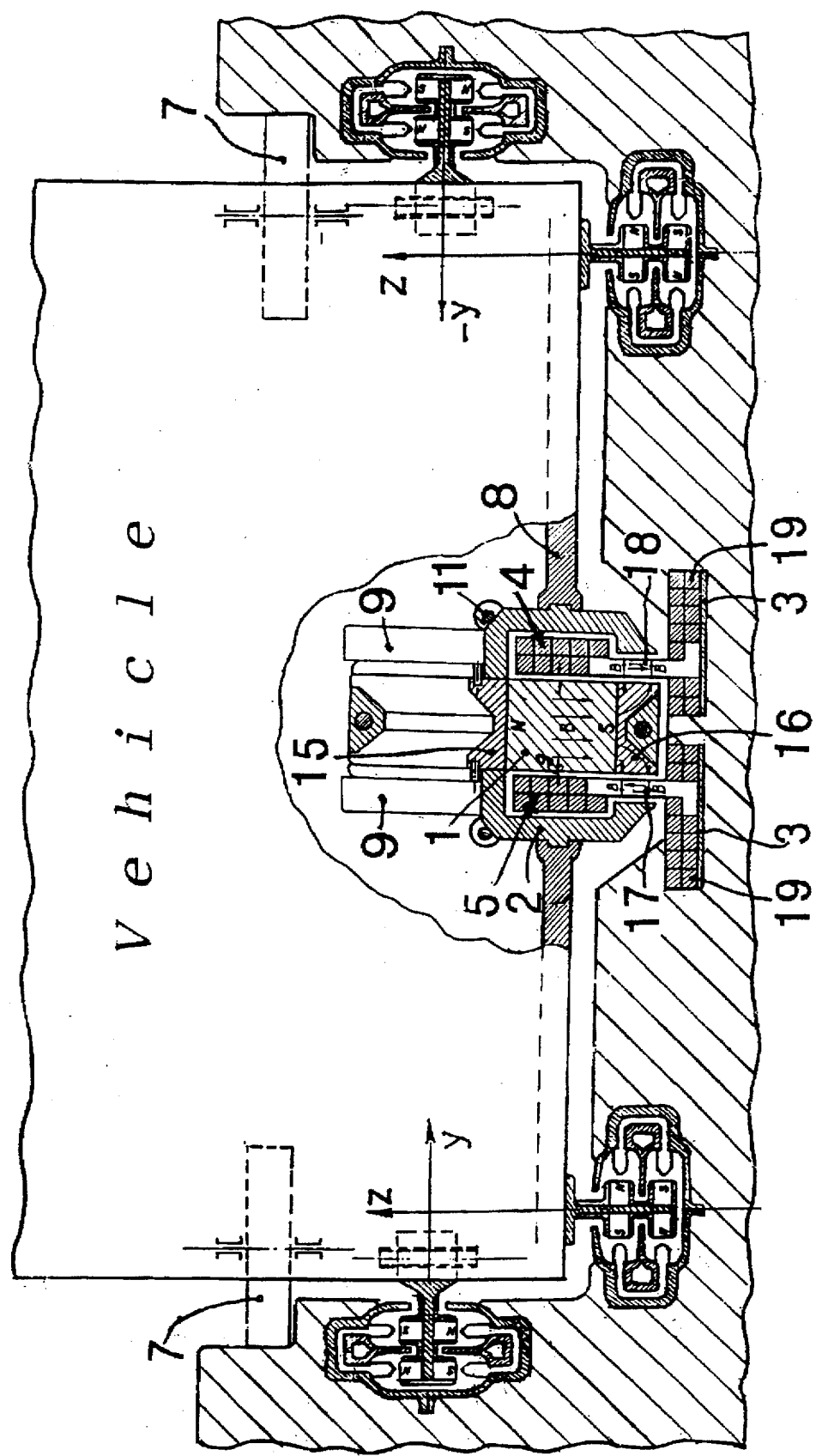
FIG. 1 is a schematic cross-sectional view of the vehicle assembly together the linear synchronous motor( PMLSM) and magnetodynamic levitation and stabilizing self-regulation (MDLSS) system.

The Linear Synchronous Motor comprises a linear guideway/stator assembly (stationary part) and permanent magnet rotor assembly (moving part). As seen in FIG. 1, the linear synchronous motor of the present invention includes:

a) the guideway/stator 3, 4, 10 extended along the trajectory of the vehicle motion;

b) the permanent magnet rotor 1, 2, which is fixed to the vehicle chassis 8 and has magnetic units changing its pole pitches;

c) a synchronizing device 9 for stepped changing rotor pole pitches (simultaneously with changing the turn length of the stator winding during the vehicle motion) by switching on/off the corresponding units;

d) a synchronizing mechanism 11 for smooth variation of rotor pole pitches (simultaneously with changing the turn length of the stator winding during the vehicle motion) by drawing apart or together the magnetic units belonging to the rotor front and back halves.

The guideway/stator as shown in FIGS. 2A–2D, has common concrete beams 10 with two toothed holders 3 and two triple-phase conductive windings 4, 5 which extend along the guideway. As seen in FIGS. 2A–2D, the stator is formed from two mirror-symmetrical parts. Each part includes one toothed holder 3 having a "T"-shaped cross-section. Holder 3 is attached to beam 10 and supports the conductors 17, 18 3 of the triple-phase windings 4 and 5, respectively. When the triple-phase stator winding 4, 5 is coupled to an electric generator, then(due to the time lag of the phase currents on ⅓ of the period and displacement of the conductors of adjacent phases on ⅔ of their turn length $L_t$ along the stator) the winding generates a wave of current traveling along the stator.

The traveling current wave may have a permanent amplitude if the conductors of the triple-phase winding are thin and placed with three layers (one phase per layer) which are shifted one with respect to another by ⅔.$L_t$. Then, the density of the phase winding turns (i.e., the number of winding turns of the phase per unit of the stator length) alternates sinusoidally along the stator with the distance x. In our case the winding conductors are thick and all three phases must be placed with one layer in the slots of the tooth holder. Therefore, in order to reduce the vibration of the current wave amplitude the working segments of the different winding phases must interchange in the order shown in FIG. 3. where letters A',B',C' indicate front segments of turns belonging to three phases, and A,B,C indicate back segments of the phase turns.

Figure 3:
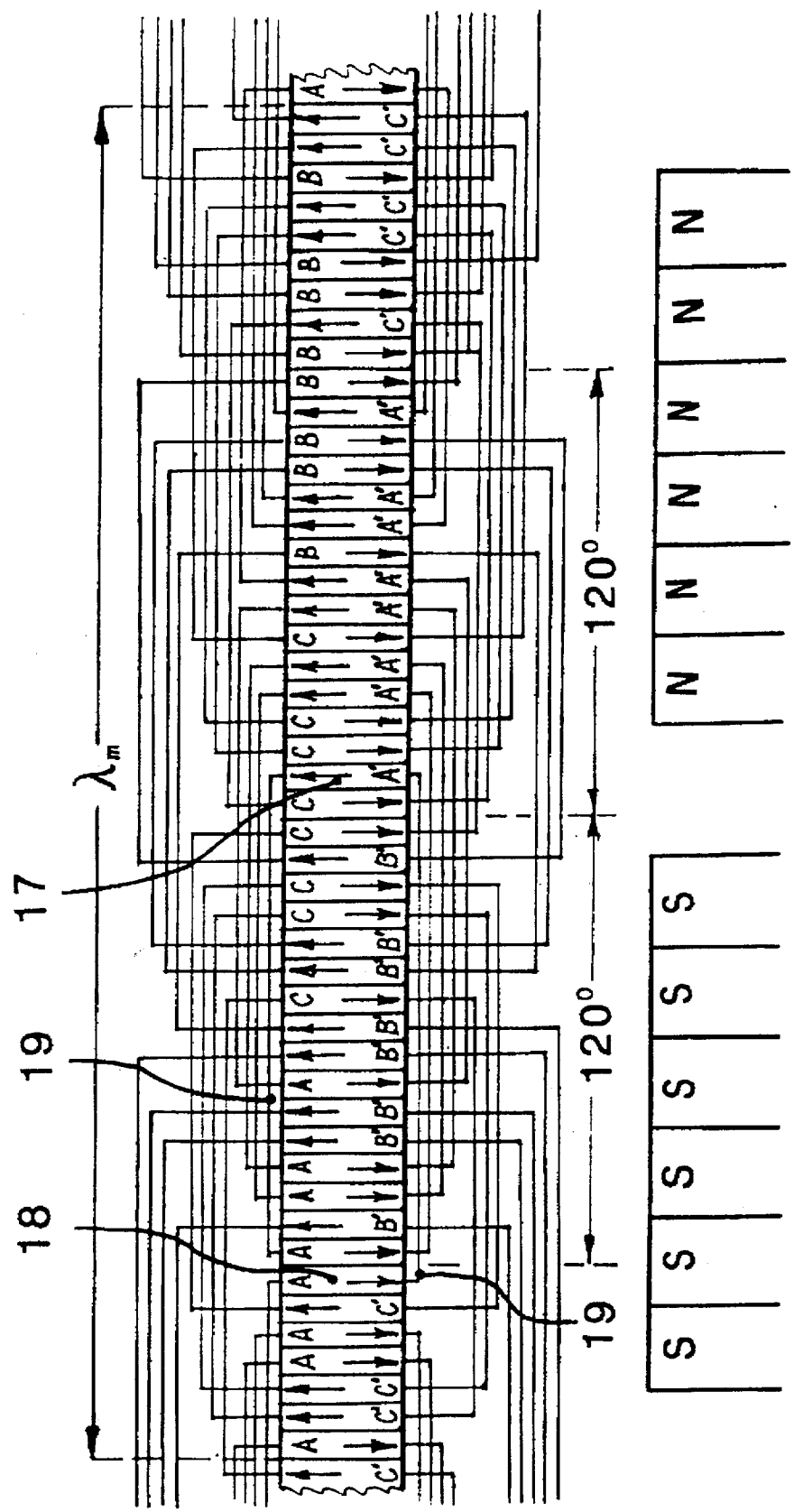
FIG. 3 is scheme of left-side winding of the stator and distribution of the working segments and turns along x-axis.

Each of the phases A,B,C of the stator winding comprises 2 v turns buses which are placed into the holder slots in some sequence, for example, when v=4 the sequence is as follows: A.C'.C'.A.A.C'.A.A.B'.A.A.B'.B'.A.B'.B'.C.B'.B'.C.C.B C.C.A'.C.C and so on where letters A',B',C' indicate front segments of turns belonging to three phases, and A,B,C indicate back segments of the phase turns, as best shown in FIG. 3.

Velocity V of the current traveling wave equals V=2 $L_t$f where f is the current frequency.

The conductors in the winding are copper buses. Each individual turn has front and back, which represent working segments 17 and 18, and two side parts 19 connecting the working segments. The working segments (which contribute to the creation of Lorentz forces, and also counter electromotive forces) are fixed in the slots of the holder with a single layer. The side parts (upper and bottom ones) form the end-faces as a monolithic multilayer of conductors affixed to one another by an inner layer of electrical insulation 6. The upper end-face is inserted into the hollow of the rotor, the bottom end-face is fixed to the concrete beam.

The stator winding has three types of distinct sections: an acceleration section, a constant velocity section, and a deceleration section.

In the acceleration section of the stator, the length of the turns smoothly increases in the direction of movement. As a consequence, the length λ and velocity V of the traveling wave of the current along the acceleration section of the guideway/stator increases until velocity equals the desired speed $V_y$ of the vehicle. In contrast, in the deceleration section the lengths of the turns smoothly decreases in the direction of movement.

Since the length λ of the traveling current wave in the stator winding equals double the length $L_t$ of the winding turn: λ=2 $L_t$, and its velocity V equals the product its length and the current frequency f: V=fλ then, knowing the radius R of the curvature of the guideway turnings and permissible centrifugal force $F_c$ related to vehicle mass $m_v$, it is possible to calculate the length of the winding turn in any cross-section of the guideway by formula:

$$L_t = \sqrt{(F_c R / 4 f^2 m_v)}$$

The rotor of the PMLSM comprises an even number of identical units (see FIGS. 2A–2C) installed on the vehicle chassis in a row along the vehicle. Each unit contains two steel cores 2 of cylindrical form and "C"-shaped cross-section with upper 13 and lower 14 core shoes placed opposite to each other and a permanent magnet 1 designed in form of a rectangular parallelepiped (with the height $h_m$ and width $w_m$) with steel pole shoes 15, 16 rigidly attached to the magnet. The permanent magnet is inserted in the gap between core shoes 13, 14 and can be shifted in vertical direction with respect to the cores 2. Polarities of the magnets belonging to the front half of the rotor are the same and opposite to those belonging to the back one. Cores belonging to each half of the rotor are rigidly coupled, however, and both halves can be smoothly draw apart and together along the car, thus changing the distance between the rotor poles during the vehicle motion.

The distance between the upper core shoes 13 equals the width $w_m$ of the magnet, while the distance between the bottom core shoes 14 is larger and equals to $w_m$+2 g. Therefore, when the magnet 1 is shifted upward its magnetic field is closed through the upper core shoes and the unit (which the magnet belongs to) is disengaged. When the permanent magnet is shifted downward the unit is engaged and then, together with its cores, the magnet creates a two-loop magnetic circuit containing two air gaps (distance g). In this case, the working segments of both parts of the winding are inserted into the air gaps of above circuit and, because of small size of the air gaps, the resulting magnetic flux density is of considerable value (about 1 T).

When the winding is attached to a constant frequency triple-phase generator, the above mentioned current wave traveling in the conductors traverse the working gap of the magnetic units and generates the propulsion force F=ΣBLI (i.e., the summation of Lorentz forces) that carries the rotor and the vehicle.

At the same time the magnetic field within the working gap of the units crosses the winding conductors and induces the counter-electromotive force E=ΣBLV which accompanies the process of transforming the electromagnetic energy into the mechanical work necessary to propel the vehicle.

As best shown in FIGS. 1 and 2A–2C, the steel cores 2 and the permanent magnets 1 are installed on the vehicle.

The rotor cores 2 are rigidly connected with the vehicle chassis 8 and can be moved only in the direction of the vehicle motion (i.e., along the Axis 0X). In addition, the unit magnets are connected with the cores and can be moved only upward and downward with respect to the cores (i.e., along Axis 0Z) and cannot move between the steel cores 2 in the horizontal direction along the Axis OY perpendicular to the Axis OZ. Therefore, forces $F_y$ attracting the magnets to the cores are compensated by the reactions of the ties between the steel cores 2 and the resoective permanent magnets 1; that further means that there exists no destabilizing force displacing the vehicle in the horizontal direction along the Axis OY within the PMLSM of the present invention in contrast to known systems (for instance, disclosed in U.S. Pat. Nos. 5,225,726 and 5,208,496) having the cores installed on the guideway.

Figure 4:
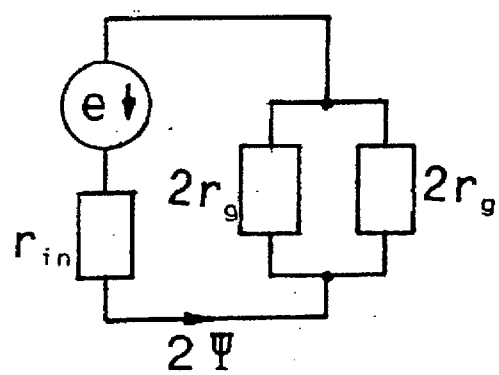
FIG. 4 is scheme of the magnetic circuit of the rotor.

The equivalent scheme of the magnetic circuit is shown in FIG. 4. The designations are as follows: $H_c$ is the coercive force of a magnet; $\lambda_r$ is the relative magnetic permeability of the magnet; $h_g$ is the height of the bottom core shoe. Then, the magneto motive force $e_m$ is $$e_m = \mu_o H_c h_m,$$

the internal magnetic reluctance of the magnet body is $$r_{in} = h_m/(\mu_r w_m),$$

the total magnetic reluctance of two air gaps is $$r_g = g/(2h_g).$$

Consequently, following Ohm's law for a magnetic circuit, the total magnetic flux $2\psi$ in the working gaps is $$2\psi = e_m/(r_{in} + r_g),$$

and the magnetic flux density in the working gap is $$B = \psi/h_g.$$

Accordingly, the maximal propulsion force of the unit is expressed by the following formula:

$$F_{propuls.} = 2Bh_g j S_b k,$$

where j is the permissible (by heating) current density in the working segments of the stator winding; $S_b$ is the bus cross-section; k is the number of the buses in the air gap of an individual unit.

An approximate evaluation of the permissible current density j in the cross-section of the winding buses when heated showed that it must not exceed $j=10^7$ A/m² during vehicle movement at speed $V_m=180$ m/s along a guideway fragment of 300 m (powered by one transformer) if the permissible temperature rise is $\Delta t°=100°$ C.

Figure 2A:
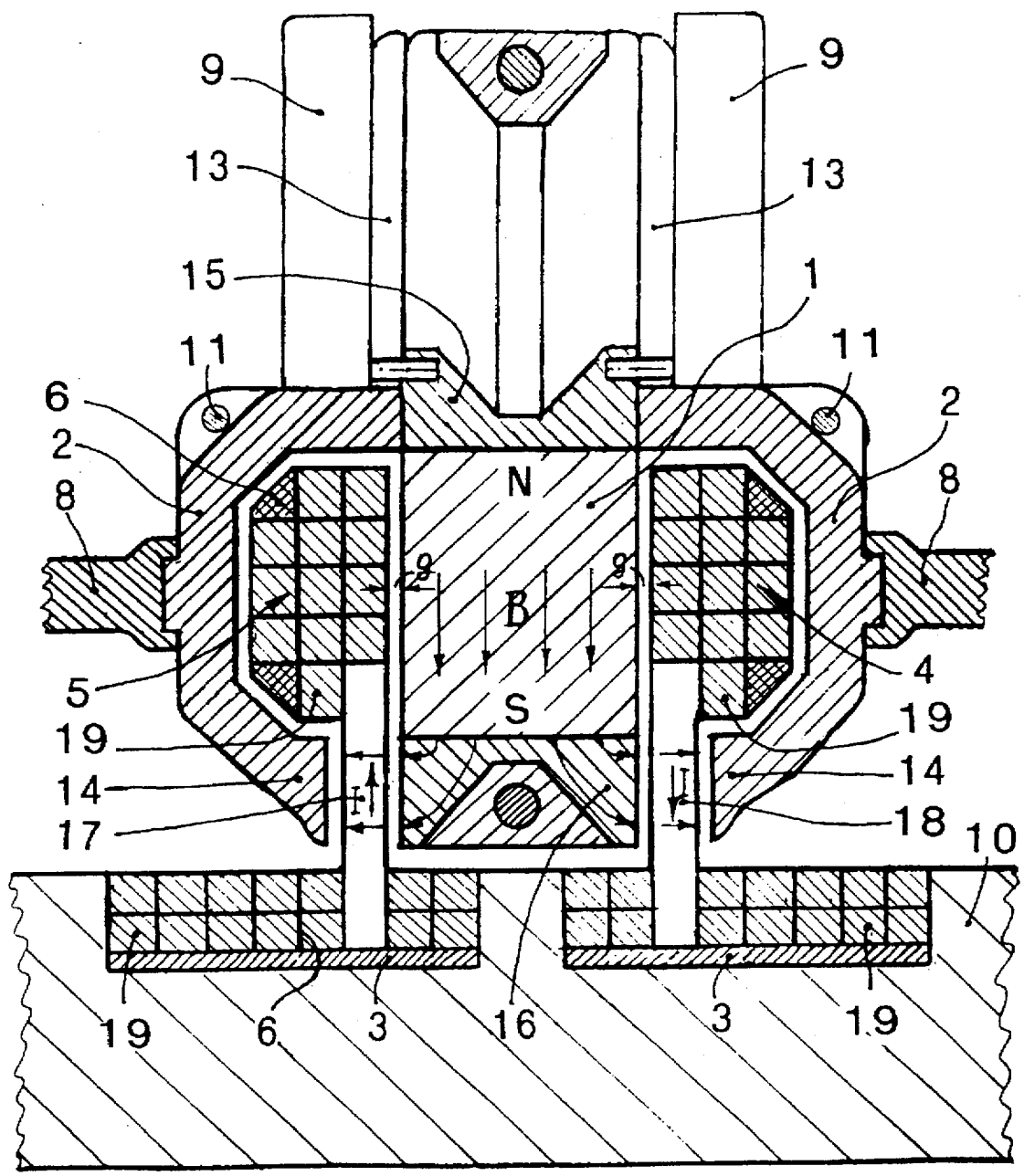
FIGS. 2A and 2B are, respectively, partial cross-sectional and axial sectional views of the linear synchronous motor.

The dimensions and weight of the rotor of the PMLSM depend considerably on the dimensions of its cores which, in their turn, depend on the cross-section of the upper end-face of the stator winding in the following manner: the greater the square $S_w$ of the end-face, the greater the core dimensions. The propulsion force is created only by vertical (working) segments of the winding turns. Accordingly, it is not necessary to created closed winding turns. When the rotor is moving, the upper end-face of the stator winding must move freely without contact through the hollow of the rotor "C"-shaped core (FIG. 2A). Accordingly, it is expedient to design the stator winding in such way as to make the square of its upper end-face as small as possible. This considerably reduces the weight of the core and, in addition, increase the durability of the winding, from which the vehicle repels.

Figure 5:
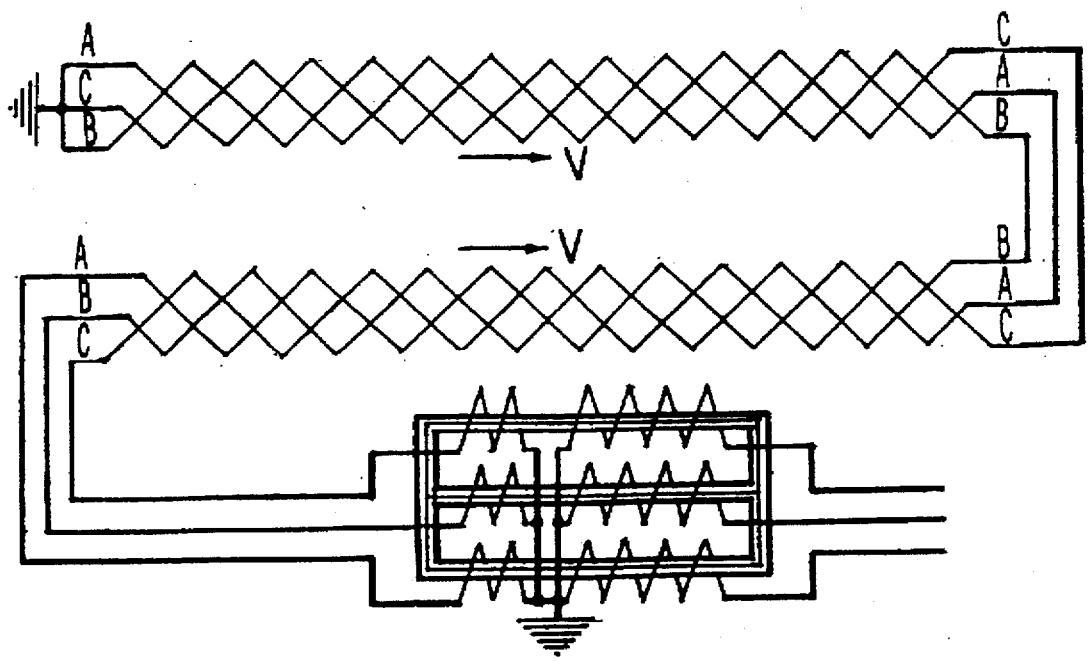
FIG. 5 is scheme of power supply of a stator fragment.

To describe the winding construction we shall first consider the circuit powering the fragment of the stator where the vehicle is moving. The step-down transformer serves as a source of power for this fragment (FIG. 5). Each phase coil of its secondary winding feeds the phase of both the right-hand and left-hand stator windings.

Magnetic lines in the left-hand and right-hand air gaps of the rotor are oriented contrarily. Therefore, to achieve summarizing Lorentz forces created by the left-hand and right-hand windings the currents in the left-hand and right-hand buses must flow in opposite directions. This means that at the end of this fragment (when the right-hand and left-hand windings are connected in series) it is necessary to change sequence of phases.

Figure 2B:
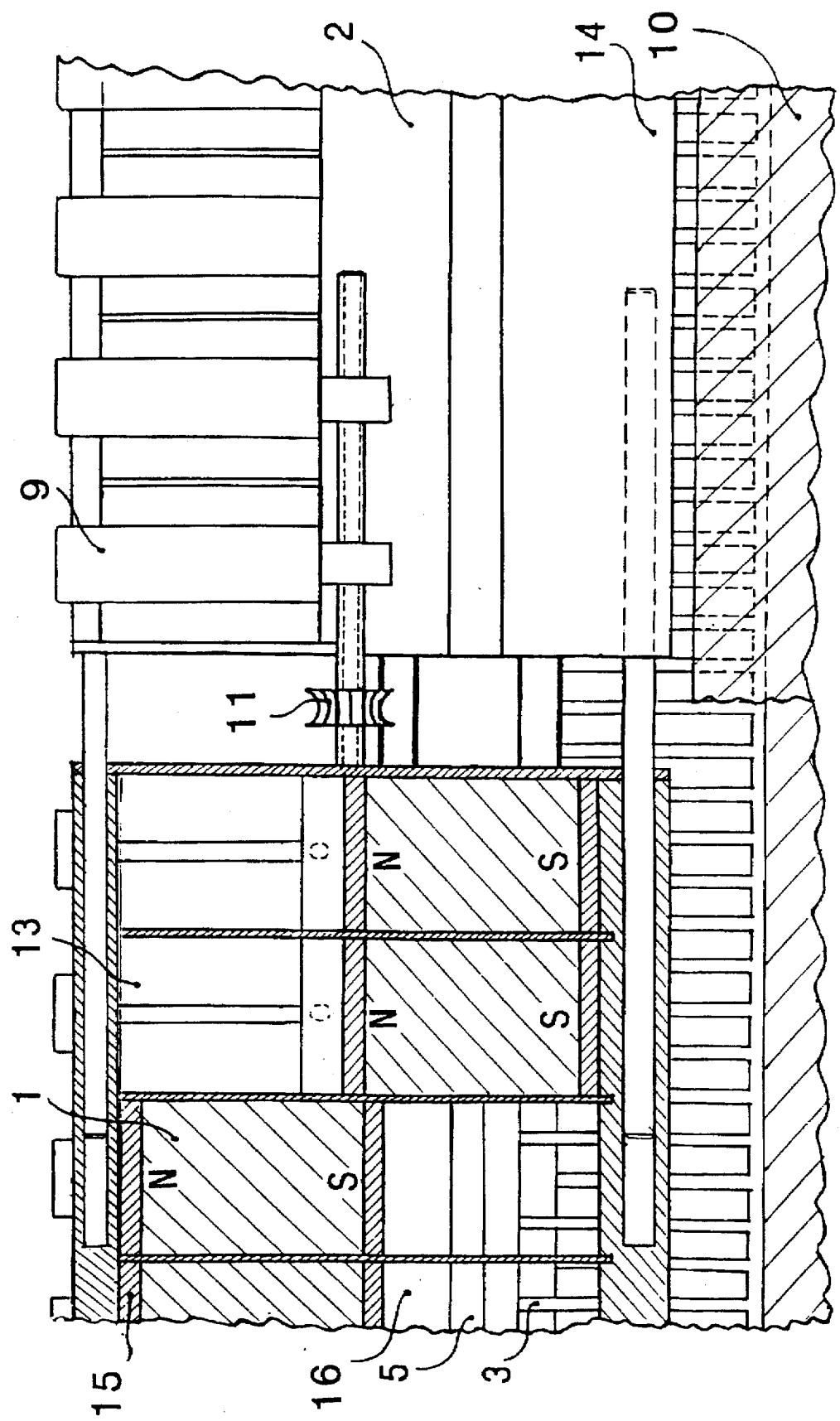
Figure 2C:
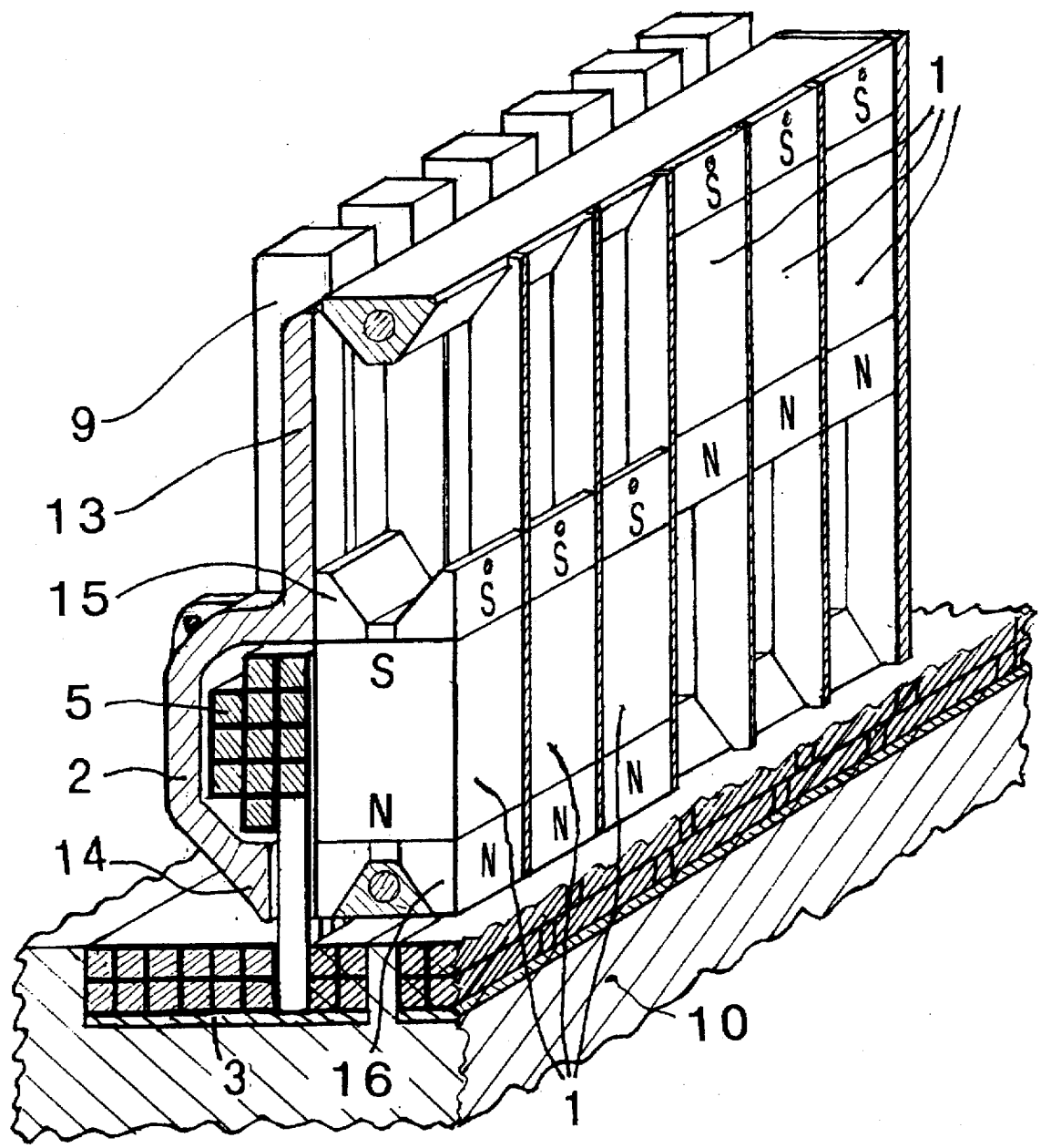
FIG. 2C is a prospective view of the linear synchronous motor of the present invention shown in FIGS. 1–2B sectioned in the plane parallel to the central axis of the motor.
Figure 2D:
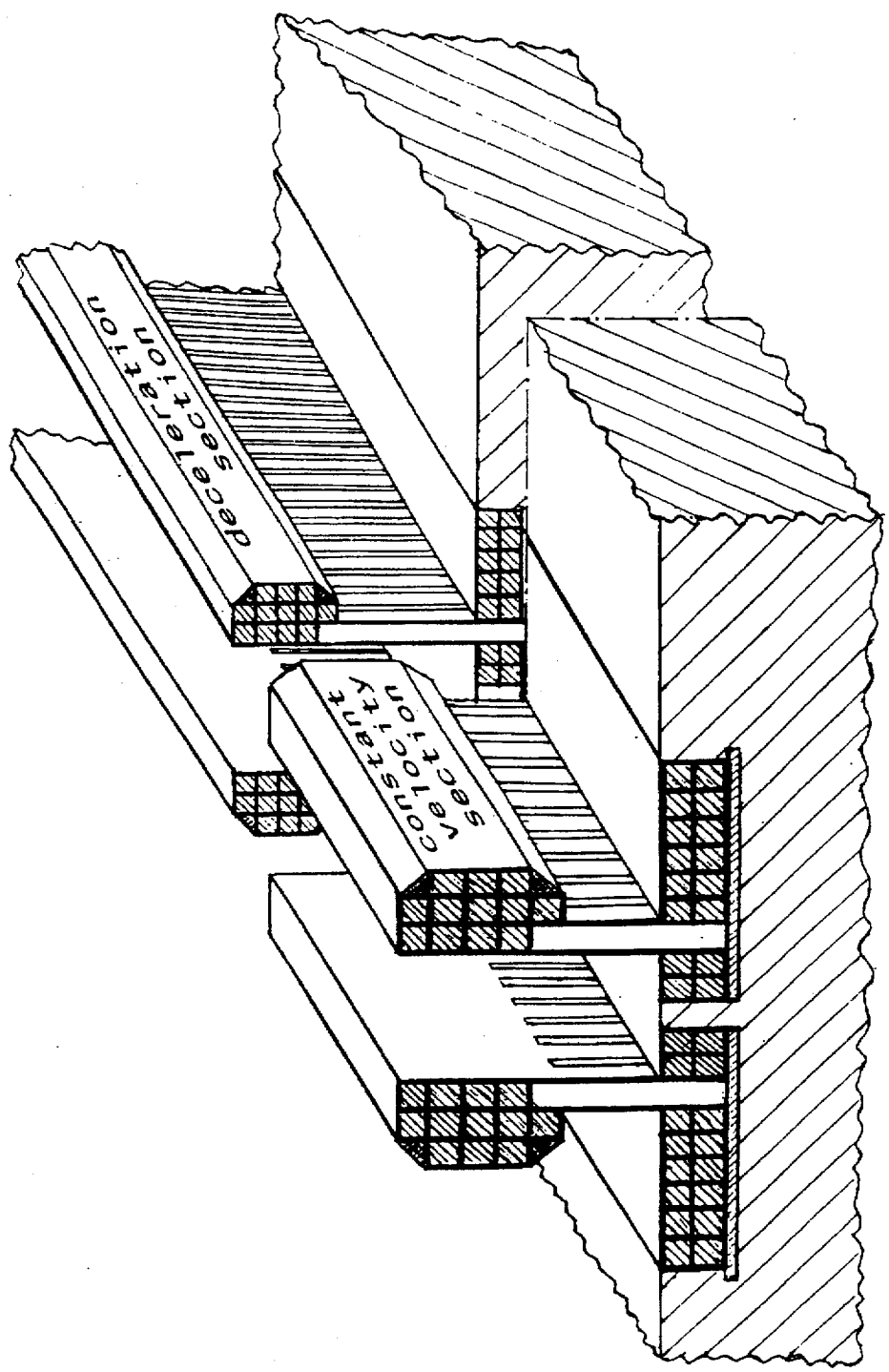
FIG. 2D is a prospective view of the guideway/stator assembly of the linear synchronous motor of the present invention showing schematically acceleration, constant velocity and deceleration sections of the stator and how the length of turns of the stator winding changes at these sections.

Each coil feeds buses slotted between teeth of a toothed holder. All buses of both right-hand and left-hand windings belonging to the same phase are placed respectively in the right-hand and left-hand toothed holder with a single layer (as shown in FIG. 2B) forming the winding turns. In order to reduce the square of the upper end-face in the proposed PMLSM when assembling the windings every bus should be bent in such a way that $\nu$ of its turns were coiled clockwise and another $\nu$ turns were coiled counter-clockwise (on every fragment of the stator with the length equal to the length of the traveling wave). In this case, as one can see in FIG. 3, the maximal size of the cross-section of the upper end-face is reduced to 2.5 $\nu S_{bm}$, thus reducing rotor weight.

Now we determine the number "$\nu$" and $S_w$—the value of the maximal cross-section of the upper end-face of the winding on a guideway section with maximal winding turn length $L_{tm}$, where the current traveling wave runs with the maximal velocity $V_m = f\lambda_m$. The cross-section of the buses on this section also must have maximal value, i.e., $S_b = S_{bm}$.

There are 12 $\nu$ of the working segments of the winding with the total cross-section $S = 12 S_{bm}\nu$, which could fit in a rotor air gap. The following technological considerations require that the maximal cross-section of the bus $S_{bm}$ be of a square shape with the side $w_b = \sqrt{S_{bm}} = g - 2\delta$, where $\delta$ is a distance between the pole shoes (of the core and magnet) and the surface or the working segment in the air gap of the rotor (see FIG. 2A). As far as durability is concerned, the thickness of the strengthening teeth of the toothed holder must be equal to half the bus thickness, i.e., $w_b/2$. Then, the total cross-section of the working segments layer in the rotor gap is determined by the formula:

$$S = 2/3 \lambda_m \sqrt{S_{bm}}.$$

Equating both formulas for S we will find the value of $\nu$ which is rounded number of the expression $$\lambda_m/18/(g - 2\delta).$$

Hence, we can obtain the desired value of the cross-section of the upper end-face winding determining dimensions of the rotor cores:

$$S_w 2.5\nu(g - 2\delta)^2$$

On the other guideway sections where the winding turn length $L_t$ is less than $L_{tm}$ and is variable, the bus thickness (i.e., the size of the working segments along the stator) must be reduced proportionally to $l_t$, leaving the bus width $w_b = \sqrt{S_{bm}}$ invariable and equaled to $(g - 2\delta)$.

The permissible current $I_p$ in the air gaps of PMLSM is:

$$I_p = 12\nu j(g - 2\delta)^2 \quad (12)$$

The maximal propulsion force of the linear motor as a whole is:

$$F_{prop.m} \leq 2Bh_g I_p q$$

where q is coefficient considering the shift of the rotor poles and non-sinusoidal distribution of the winding turns of the phase winding.

The scheme of the complete left-side winding (with $\nu=4$) is shown in FIG. 3.

When the vehicle begins to depart the station it employs wheels rotated by the direct current motors, which are supplied with power from constant voltage busbars located on the concrete beam of the guideway. In these sections the winding turn length of the stator is constant and equals unit length $L_R$. The section winding gets power from a triple-phase alternative current power system. To limit current in the winding a supplemental resistor is provided, connected with the winding in series. This resistor can be shunted if needed. The rotor of the PMLSM must have minimal pole pitch $L_P = L_R$ when accelerating, which means that only two central units are under operation.

Before entering the acceleration section the vehicle must attain a speed equal to that of the traveling wave in the winding. Moreover, the magnetic field in the air gaps of its rotor must be oriented in the same direction as the magnetic field of the traveling wave. Just when this happens, said resistor is short-circuited, and the motor comes into synchronism and begins to propel the vehicle. At the next (acceleration) section the winding turn length is gradually increased, and the velocity of the current traveling wave increases.

As was noted above, the acceleration of the vehicle is realized by both the synchronizing device 9 and the synchronizing mechanism 11. The synchronizing device 9 serves to change the rotor pole pitches in steps (simultaneously with changing the turn length of the stator winding during the vehicle motion) by switching on/off the corresponding units. The synchronizing mechanism 11 is designed to smoothly change the rotor pole pitches by drawing apart or together the magnetic units belonging to the rotor front and back halves. The work of the synchronizing device 9 and the synchronizing mechanism 11 may alternate in different combinations.

Let us consider how the synchronizing device 9 works when the vehicle moves along the acceleration section. This device 9 is switched on by its sensor signals and increases in steps the pole pitch length in compliance with increasing traveling wave velocity. Then the propulsion force grows that helps the vehicle to overcome the growing resistance of the air and vehicle inertia.

The synchronizing device 9 must switch on the rotor units in strict sequence. Each signal from the next sensor must switch on its drive gear, moving downward those two magnets of contrary polarity (belonging to the front and rear parts of the rotor) which are closest to the rotor center. Electric, hydraulic, or pneumatic drive gears may be used.

The synchronizing mechanism 11 smoothly increases the pole pitch length by drawing apart or together the magnetic units belonging to the front and back halves of the rotor units. Said synchronizing mechanism 11 begins working just after several unit pairs have been engaged. It reacts on the increment of the length of the winding turns and changes the distances between the both halves of the rotor, thus allowing the propulsion force and the vehicle speed to be increased. In its simplest form this mechanism is formed from a long screw having both right and left-hand rectangular threads on both its halves.

Example of approximate PMLSM evaluation
Initial data

Dimensions of the details (in meters): $W_m = 0.2$, $h_m = 0.24$, $h_g = 0.1$, $t_r = 0.05$, $g = 0.06$, $\delta = 0.01$ m, coercive force $H_c = 8.9 \cdot 10^5$ A/m, $V_m = 180$ M/s, $f = 60$ Hz, $j = 10^7$ A/m$^2$, specific gravity of the magnet material $d_m = 7.4$ kG/dm$^3$, specific gravity of the core steel $d_{Fe} = 7.8$ kG/dm$^3$.

The magneto motive force $-e_m$ in a unit is $e_m = \mu_o H_c h_m = 0.2684$, the internal magnetic reluctance per 1 m is $r_{in} = h_m/\mu_r/W_m = 1.1215$, the total reluctance of two gaps per 1 m is $r_g = g/2/h_g = 0.3$, the magnetic flux in one gap per 1 m is $\psi = e/2/(r_{in} + r_g) = 0.0944$ Wb, the magnetic flux density in the gap is $B = \psi/h_g = 0.944$ T, the permissible current value in one gap is $$I_m = 12vj(g - 2\delta)^2 = 7.68 \cdot 10^5 A,$$

the maximal propulsion force of the linear motor is $$F_{max} = 2BI_m h_g q \geq 10 \text{ tons},$$

the maximal cross-section of the upper winding end-face is $$S_w = 2.5vj(g - 2\delta)^2 = 0.016 \ m^2$$

the weight of the motor magnets is $G_m = \lambda_m \cdot h_m w_m d_m \cdot 0.8 \approx 0.9$ ton, the weight of the rotor steel cores is $G_c \approx 2 \ G_m = 1.8$ ton, the weight of the rotor PMLSM is $G_{PMLSM} \approx 2.8$ ton, the overall dimensions of the rotor PMLSM are $(0.6 \times 0.6 \times 3.1)$m

What is claimed is:

1. A linear synchronous motor for a high speed ground transportation vehicle, comprising:

(a) a linear stator/guideway assembly extended along trajectory of said vehicle's motion, said stator/guideway assembly including a pair of mirror-symmetrical stator windings each having distinct sections thereof, each said stator winding including a plurality of turns having different length along said distinct sections, wherein, being powered with three-phase alternating current, said stator windings generate traveling waves having variable velocities and accelerations at said distinct sections of the stator windings, frequency of said current being constant along all said distinct sections of the stator windings, each of said turns of the stator windings including two vertical working segments, each having a layer of conductors;

(b) a permanent magnet rotor, comprising an even number of substantially identical magnetic units disposed in a row along said vehicle, said row being divided into front half and back half thereof, each said magnetic unit including two steel cores and a permanent magnet magnetized vertically and movable between downward and upward positions thereof with respect to said steel cores, two air gaps being formed therebetween, said permanent magnet, being in the downward position thereof, creates permanent magnetic field in said air gaps, said layers of conductors of the working segments of the stator windings extending through said air gaps, so that the traveling wave interacts with said permanent magnetic field in the air gaps, thereby creating propulsion force propelling the vehicle along said trajectory, and wherein a pole-pitch of said permanent rotor increases when said permanent magnet is in the downward position thereof and decreases when said permanent magnet is in the upward position thereof;

(c) a synchronizing device operatively associated with said rotor to vary step-wise the length of the pole-pitch thereof during the vehicle's motion by moving the permanent magnets downward and upward; and (d) a synchronizing mechanism operatively associated with said rotor to provide smooth variation of the length of the pole-pitch of the rotor during the vehicle's motion by varying distance between said front and back halves of the raw of the units, said synchronizing device and mechanism performing coordination between the length of the turns of the stator windings and the length of the pole-pitch of the rotor.

2. The linear synchronous motor of claim 1, wherein said distinct sections include acceleration section, deceleration section and constant velocity section extending therebetween, wherein in the acceleration section, the length of the turns of the stator winding increases in the direction towards the constant velocity section, wherein along the constant velocity section, the length of the turns is substantially constant, and wherein in the deceleration section, the length of the turn decreases in the direction from the constant velocity section.

3. The linear synchronous motor of claim 1, wherein said stator windings are three-phase windings including A,B,C phases.

4. The linear synchronous motor of claim 3, wherein said stator windings are supported by toothed holders having respective slots, said layers of conductors of the vertical working segments of the stator windings being accommodated in said respective slots.

5. The linear synchronous motor of claim 1, wherein polarities of the permanent magnets in said front half of the raw of said units are identical, wherein polarities of the permanent magnets in said back half of the raw of said units are identical and opposite to the polarities of the permanent magnets in the front half of the raw of said units.

6. The linear synchronous motor of claim 4, wherein each said turn of the stator winding includes front and back vertical working segments, and side horizontal parts connecting said working segments, said side horizontal parts forming monolithic multilayer upper and bottom end-faces of sandwiched conductors separated by an inner layer of electrical insulation; said upper end-face being inserted loosely in a hollow between a respective one of said steel cores and the permanent magnet of the rotor; said bottom end-face and said holder being rigidly attached to a concrete beam of the stator/guideway assembly; each of the phases A,B,C of the stator winding comprises a certain even number of turns buses which are placed into said slots of the holder in a predetermined sequence.

7. The linear synchronous motor of claim 6, wherein said turns of the stator windings are made of copper buses.

8. The linear synchronous motor of claim 6, wherein the length of the turns of the stator winding and thickness of the buses are proportional to the assigned speed of the vehicle in a given cross-section of the guideway.

9. The linear synchronous motor of claim 6, wherein each bus is bent in such a way that half of said certain number of its turns are coiled clockwise and another half of said certain number of the turns are coiled counter-clockwise on every fragment of the stator winding, with the length of the turns equal to the length of the traveling wave.

10. The linear synchronous motor of claim 1, wherein said permanent magnet has a substantially rectangular cross-section with upper and bottom edges thereof, and is provided with a pair of saddle-shaped pole shoes, each installed on a respective one of said upper and bottom edges of the permanent magnet, wherein said steel cores include "C"-shaped steel cores, and wherein, once shifted downward, said saddle-shaped pole shoes and "C"-shaped steel cores split the magnetic flux in two equal parts, turning its magnetic lines in horizontal position and concentrating them in the air gaps of said unit, thereby providing intensive transformation of electromagnetic energy of current in the working segments of the stator winding into the moving vehicle's mechanical energy.

11. The linear synchronous motor of claim 10, wherein in said unit, once said permanent magnet has been shifted upward, the magnetic flux in the air gaps disappears and magnetic lines are closed through the upper core shoes skipping said working segments of the stator winding.

12. The linear synchronous motor of claim 11, wherein the steel cores of the front half of said raw of the units are rigidly connected, wherein the steel cores of the back half of said raw are rigidly connected, and wherein said vehicle includes chassis having longitudinal slots; said front and back halves being installed in the longitudinal slots of the chassis and moving apart and together during vehicle motion, thus smoothly changing the length of rotor pole pitch.

13. The linear synchronous motor of claim 12, wherein the steel cores are connected with the vehicle chassis and move exclusively in the direction of the vehicle motion; wherein the permanent magnets are connected with the steel cores and move exclusively upward and downward with respect to the steel cores, and wherein the forces of attraction of the permanent magnets to the steel cores are completely compensated by the reactions of the ties between the steel cores and the permanent magnets.

* * * * *